United States Patent [19]
Barbarasch

[11] 4,199,875
[45] Apr. 29, 1980

[54] VISIBILITY EFFECTS GENERATOR

[75] Inventor: Joseph Barbarasch, Endwell, N.Y.

[73] Assignee: The Singer Company, Binghamton, N.Y.

[21] Appl. No.: 845,743

[22] Filed: Oct. 26, 1977

[51] Int. Cl.$^2$ ............................................... G09B 9/08
[52] U.S. Cl. .................................... 35/12 N; 358/104
[58] Field of Search .................. 35/11 R, 11 A, 12 N, 35/10.2, 25; 358/104

[56] References Cited

U.S. PATENT DOCUMENTS

| | | | |
|---|---|---|---|
| 3,422,207 | 1/1969 | Flower et al. | 35/12 N |
| 3,515,802 | 6/1970 | Wise | 35/12 N X |
| 3,524,019 | 8/1970 | Coen | 35/12 N X |
| 3,541,584 | 11/1970 | Simon et al. | 35/12 N |
| 3,826,864 | 7/1974 | Paufve | 35/12 N X |
| 4,016,658 | 4/1977 | Porter et al. | 35/12 N |

Primary Examiner—Vance Y. Hum
Attorney, Agent, or Firm—Douglas M. Clarkson; Jeff Rothenberg

[57] ABSTRACT

A controlled video mixer is employed in a special effects generator of a flight simulator visual display system to produce realistic reduced visibility scenes. The video mixer produces a composite video signal from a camera video signal and a cloud function signal. The video mixer includes a gated variable transconductance device which has a differential input and operates in a range where its gain is an exponential function of its gate voltage. A control signal which is directly proportional to slant range and inversely proportional to visibility range is provided to the gate of the variable transconductance device. The output of this device is summed with the cloud function signal to produce a composite video signal which, when displayed on a TV receiver, accurately depicts atmospheric visibility effects.

14 Claims, 9 Drawing Figures

VISIBILITY EFFECTS GENERATOR

BACKGROUND OF THE INVENTION

The invention herein described was made in the course of or under a contract or subcontract thereunder, with the Department of the Navy.

1. Field of the Invention

This invention relates generally to visual display systems for flight simulators and more particularly to special effects generators used in said display systems.

2. Description of the Prior Art

Flight simulators are widely used today to train pilots and other air crew members in the successful operation of aircraft. Frequently these simulators incorporate visual display systems designed to provide realistic "through the windshield" visual images to the occupants of the flight simulator. In a typical visual display system, a camera views a reduced scale terrain model and provides a video signal which is transmitted to the simulator cockpit area for display by a television monitor or television projector. An image of terrain is thus provided to the occupants of the simulator cockpit.

Special effects generators have been developed to add sky, clouds, horizon, and limited visibility effects to the displayed scene. First generation special effects generators are illustrated in U.S. Pat. Nos. 3,422,207 and 3,515,802; a system more recently developed by E. H. Paufve is described in U.S. Pat. No. 3,826,864. Each of these prior art systems has included a visibility effects generator (VEG) for simulating restricted visibility conditions such as fog or haze.

It is known that a close approximation of true atmospheric visibility effects can be achieved by the assumption of a uniformly scattering atmosphere. With a uniformly scattering atmosphere, terrain visual information is attenuated as an exponential function of visual range, and background illuminance (haze) simultaneously increases exponentially. A mathematical expression representing this relationship has been developed.

Unfortunately, the prior art visibility effects generators do not directly implement this mathematical expression. Since the proper function has not been provided, the prior art has sometimes had to rely on software calibration tables to make the visual presentation appear proper. These tables have required special computer programs and have taken up valuable computer time and storage. Further, previous visibility effects generators have suffered from video overshoot and undershoot resulting in undesirable bright and dark areas on the screen and distracting flashing of objects as they approach the horizon.

SUMMARY OF THE INVENTION

The present invention overcomes all of the problems of the prior art by accurately implementing the mathematical expression which describes true atmospheric visibility effects.

According to the instant invention, a video signal which is to be attenuated (i.e., camera video or a sky function) is fed, along with a cloud signal, to the differential input of a controlled video mixer. The video mixer preferably includes a gate controlled variable conductance device and a summer. The variable transconductance device operates in a range where its gain is an exponential function of its gate voltage. By feeding a control voltage to said gate which is directly proportional to slant range and inversely proportional to visibility range, and by adding the cloud signal to the output of the variable transconductance device, a composite video signal is generated which accurately represents restricted visibility conditions.

One object of the present invention is therefore to provide apparatus which simply but accurately implements the mathematical expression for true atmospheric visibility effects.

Another object is to provide an improved visibility effects generator which realistically simulates limited visibility conditions such as fog or haze without the attendant distractions of black and white bars or flashing objects.

Another object is to provide a visibility effects generator which is readily assembled, simply calibrated and reasonably priced.

Yet another object is to eliminate the use of computer look-up tables when simulating limited visibility.

Yet another object is to provide a controlled video mixer which is characterized by a large dynamic range of control and can be implemented using commercially-available modules.

Other objects and advantages of the invention will, in part, be obvious and will, in part, appear hereinafter.

BRIEF DESCRIPTION OF THE DRAWINGS

For a fuller understanding of the nature and objects of the invention, reference should be had to the following detailed description taken in conjunction with the accompanying drawings, in which.

DETAILED DESCRIPTION

Figure 1:
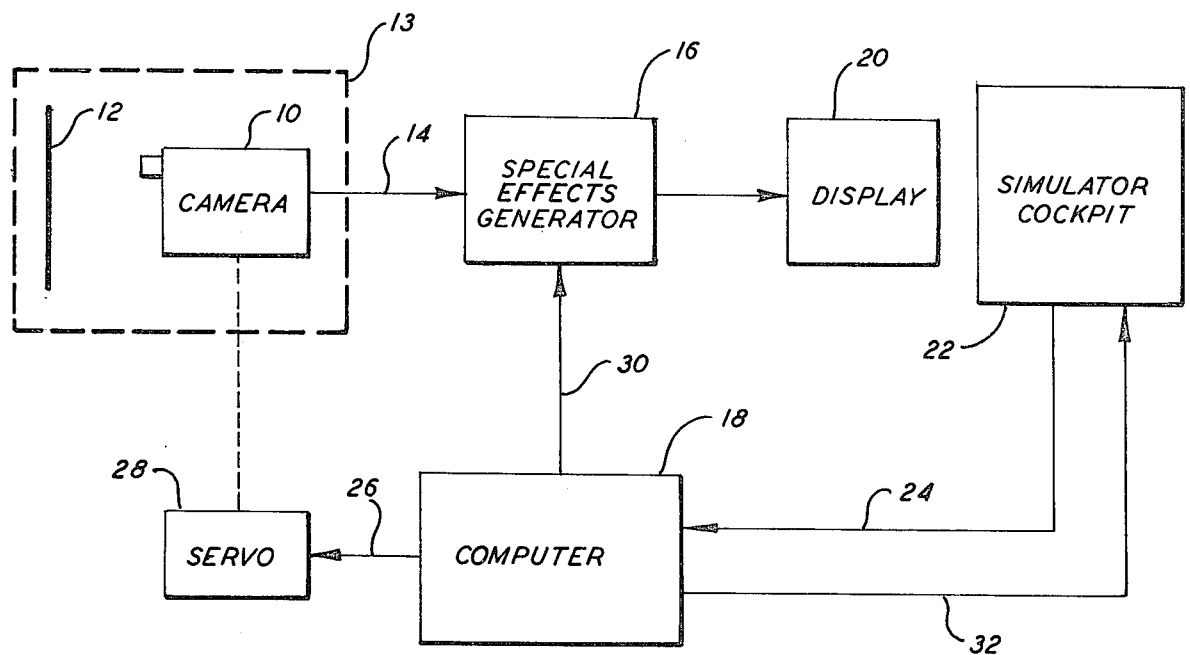
FIG. 1 is an overall block diagram of a flight simulator or visual display system employing a special effects generator.

The general arrangement of a visual system for a flight simulator is illustrated in FIG. 1. As shown therein, a television camera and probe 10 views a reduced scale terrain model 12 and provides a camera video output signal along line 14 to a special effects generator 16. Special effects generator 16, under control of computer 18, synthetically generates and adds to the video scene, fog (haze or other restricted visibility effects), a horizon, clouds, and sky shades. The composite video output of special effects generator 16 is fed to display 20 for viewing by trainees in a simulated aircraft cockpit 22. Display 20 might typically comprise a directly-viewed television monitor or a TV projector for presenting the visual scene on a screen.

In the simulator cockpit 22 are simulated controls which provide outputs to computer 18 on line 24. Computer 18 typically comprises the flight simulator computer in which are stored equations of motion of the aircraft being simulated. Computer 18 provides output signals on line 16 to a servo 28 which moves camera 10 relative to terrain model 12 in a manner which duplicates aircraft movement. Thus, as a trainee moves the simulated cockpit controls, camera 10 traces the same flight path with respect to the terrain model as the actual aircraft would with respect to the actual terrain.

Computer 18 also provides control signals to special effects generator 16, along line 30, and to cockpit instruments along line 32. The computer may further be employed to synchronize the operation of TV camera 10, special effects generator 16, and display 20, or a separate sync generator (not shown) can be employed for this purpose.

Although a camera model arrangement is shown as the image generator 13 in FIG. 1, other available image generation means, such as a flying spot scanner-film combination, or a computer image generator, may be used, either instead of, or in combination with the camera model system. Similarly, instead of a landscape, the image video may represent a seascape, a special target, such as another airplane or an aircraft carrier, or the like. For purposes of the ensuing discussion, it will be assumed that the image generator comprises a camera viewing a terrain model.

The next portion of this specification is directed to the special effects generator 16 but before describing this device it will be helpful to consider the types of scenes which are required to be presented to a pilot-trainee located in the flight simulator.

Under good visibility conditions, a terrain scene, generated by camera 10 and model 12, must appear in the foreground, with a horizon and then clouds or visible sky above. As visibility decreases, portions of the terrain must be obscured to simulate this limited visibility. When the simulated aircraft is below clouds, the upper portion of the picture should be cloud-shaded down to the horizon. Below the horizon the component of cloud shade should decrease as the range to the point on the simulated terrain decreases, and there should be a complimentary increase in the terrain video component of the scene. This simulates fog or haze.

If the simulated aircraft climbs, it may enter clouds, then come out on top of clouds and still climb further. In clouds, a constant cloud shade should fill the entire picture. Above clouds, a cloud shade should fill the portion of the scene below the horizon. The component of cloud shade should decrease with increasing angle above the horizon, and sky shade should be complimentarily mixed in to provide a "skud above clouds" effect.

Figure 2:
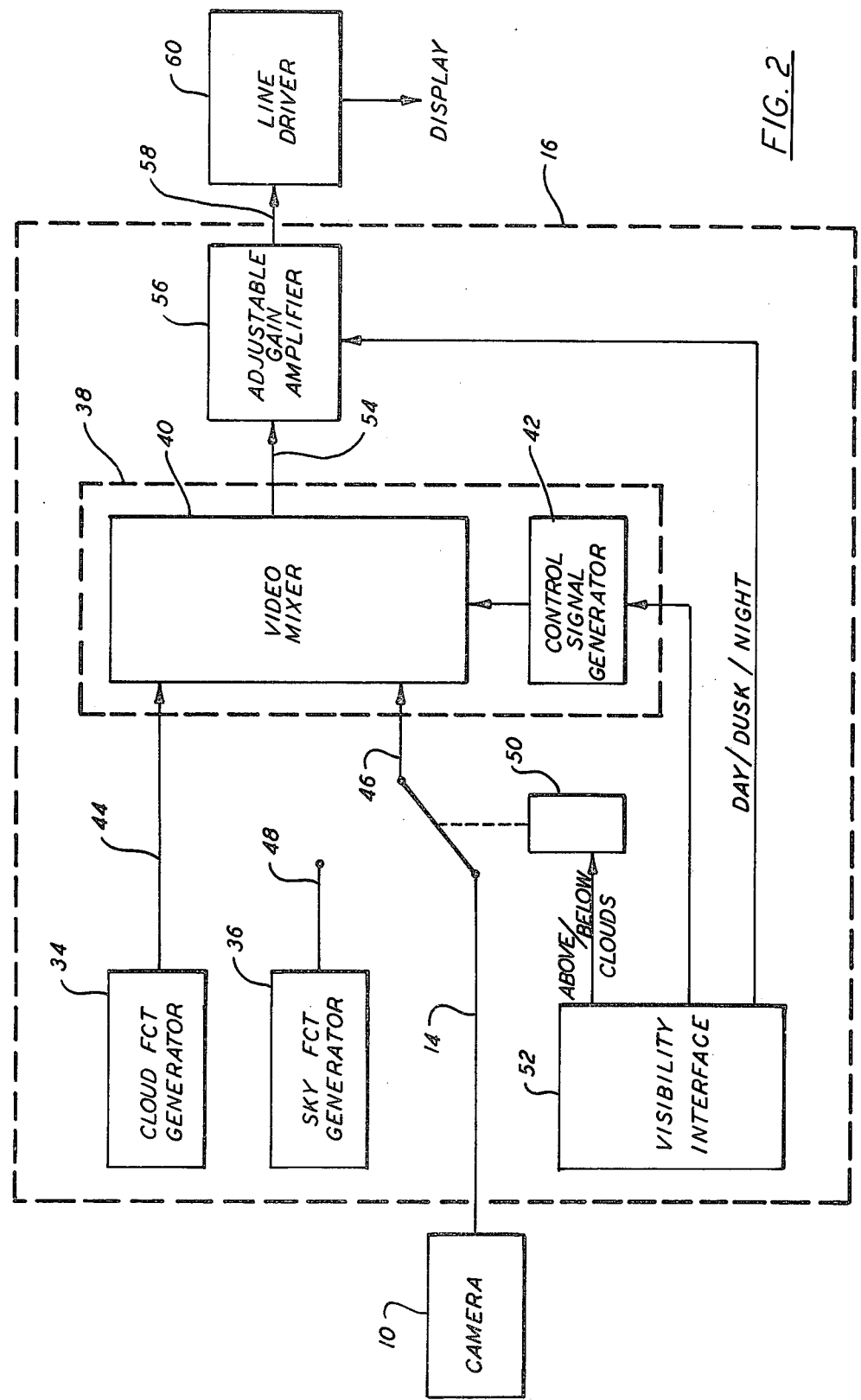
FIG. 2 is a block diagram of a typical special effects generator.

A typical special effects generator for producing the above-described visual scenes is illustrated in block form in FIG. 2. Special effects generator 16 includes a cloud function generator 34 and a sky function generator 36, both of which are separately adjustable. To simulate restricted visibility, the internally-generated cloud signal is combined with either camera video, for below-clouds flight, or with the internally-generated sky signal, for above-clouds flight. To this end, a visibility effects generator 38 is provided.

The visibility effects generator includes a controlled video mixer 40 and a control signal generator 42. Video mixer 40 continuously receives a cloud signal on line 44 from cloud function generator 34. The video mixer has a second input 46 for receiving either camera video from line 14 (when in a below-clouds mode), or sky video from line 48 (when in an above-clouds mode). A relay 50 connected to visibility interface 52 can be employed to switch between sky and camera video.

Control signal generator 42 controls the operation and thus the output of video mixer 40. The output of video mixer 40 can be pure cloud signal, pure camera video (or sky video is in above-cloud mode), or a mixture of cloud and camera video. This output is fed along line 54 to an adjustable gain amplifier 56. Amplifier 56 varies the gain of the video signal from mixer 40 as a function of ambient light, to simulate day, dusk or night flying. The output from adjustable gain amplifier 56 is fed along line 58 to a standard line driver 60 which in turn provides the video signal to the display means.

A conventional visibility interface 52, normally connected to the simulator computer, provides outputs to relay 50, control signal generator 42 and adjustable amplifier 56 as shown in FIG. 2.

Fog or haze is simulated in visibility effects generator 38 by mixing camera video (or sky video) with cloud level. It is known that a close approximation of true atmospheric visibility effects can be achieved by the assumption of a uniformly scattering atmosphere. This assumes a water droplet fog, as contrasted with a smog in which many of the particles are opaque. With a uniformly scattering atmosphere, terrain visual information is attenuated as an expotential function of visual range, and background illuminance (i.e., cloud level) simultaneously increases exponentially. These effects can be mathematically expressed by the following relationships:

$$E_0 = GE_1 + (1-G)E_2 \qquad (1)$$

and $$G = e^{-K/X} \qquad (2)$$

where,
$E_0$ = the video output of the visibility effects generator
$E_1$ = camera video
$E_2$ = cloud function
$G$ = gain
$K$ = a scale factor, and
$X$ = a shorthand notation for the quotent RVR/R where,
RVR = visibility range, and
R = slant range.

Figure 3:
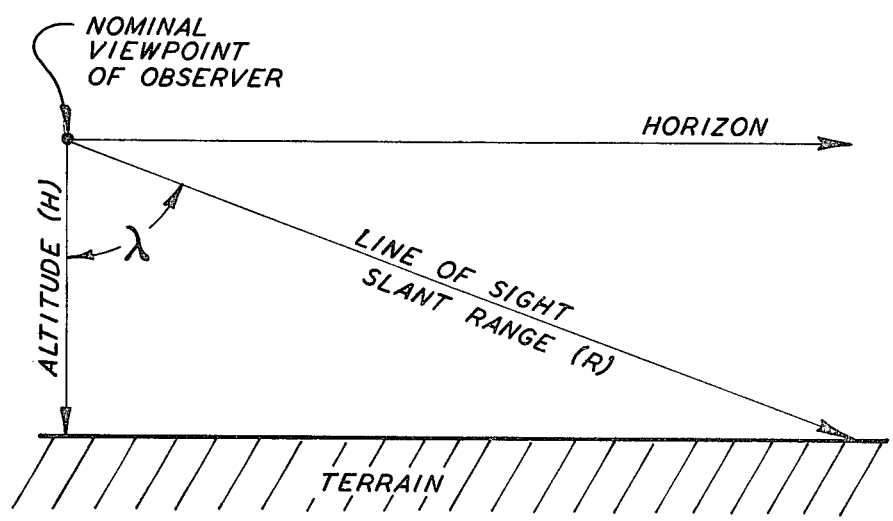
FIG. 3 is an illustration useful in understanding the terms employed in the mathematical expression representing atmospheric visibility effects.

As shown in the graphic representation of FIG. 3, the slant range, R, which is the magnitude of the instantaneous line of sight from the pilot's nominal viewpoint to the terrain plane, is related to the aircraft's altitude H above the terrain and λ, the angle between the line of sight and the local vertical. This relationship can be expressed as:

$$R = H/\cos \lambda \qquad (3)$$

Figure 4:
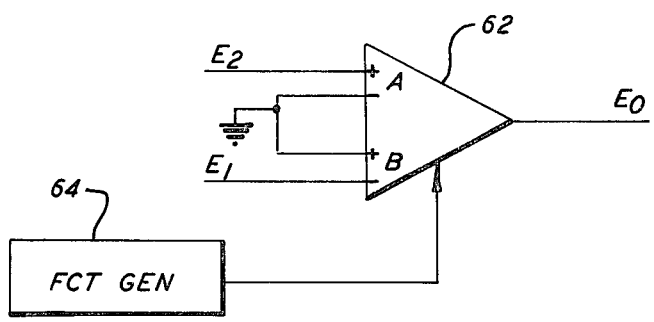
FIG. 4 is a block circuit diagram of a prior art controlled video mixer.

A prior art attempt to implement the above expressions is depicted in FIG. 4. This earlier design employed the two channels of a gate controlled wide band amplifier 62 as a video mixer. Specifically, a cloud signal $E_2$ was presented to the non-inverting input of channel A and camera video $E_1$ to the inverting input of channel B of a Motorola MC 1545 G amplifier. The inverting input of channel A and the non-inverting input of channel B were ground. A function generator 64 provided a control voltage to the gate of amplifier 62. The function generator included a multiplier and a shaping circuit incorporating diodes and potentiometers adjusted to establish break points.

Figure 5:
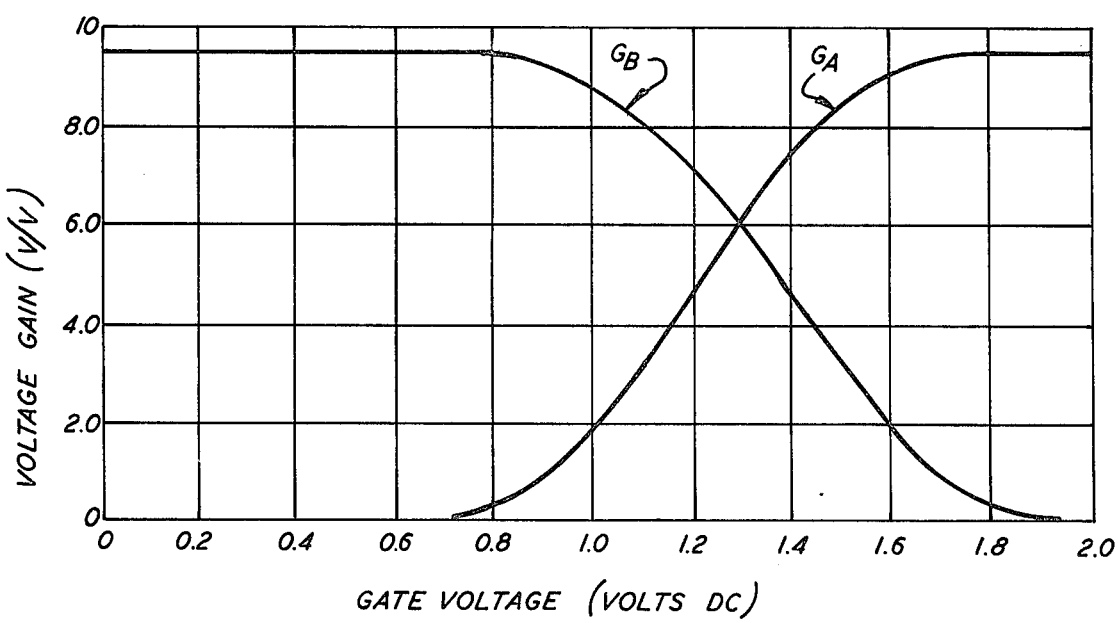
FIG. 5 is a graph illustrating the operational characteristics of the prior art video mixer of FIG. 4.

FIG. 5 shows the gain characteristics of the MC1545G. In this figure, Gain, in the form of 20 log G, for both channels of the amplifier is plotted for values of the control voltage ranging from 0 to 2.0 volts dc.

The output of MC1545G, when operated as shown in FIG. 4, is equal to the product of the value of the cloud signal times the gain of channel A plus the product of the camera video signal times the gain of channel B. This transfer function can be expressed as follows:

$$E_0 = AG_A + BG_B \quad (4)$$

where
- $E_0$ = the video output
- A = the cloud signal
- $G_A$ = the gain of channel A
- B = the camera video signal, and
- $G_B$ = the gain of channel B On the graph of FIG. 5 it can be seen that the sums of the gains of the two channels at different control voltages is greater than the maximum switched gain. This has resulted in video overshoot which produces a white bar in the visual scene. Further it has been discovered that the prior design does not provide the desired limited visibility function (i.e., equation 1) and that, therefore, software calibration tables have been needed to make the visual presentation appear realistic. These tables require special programs and take up valuable computer time and space. Moreover, the black and white bars caused by video overshoot and undershoot in the old system, result in objects becoming intensified and flashing as they approached the horizon. This distracting effect coupled with the difficulty in calibrating the function generator of the earlier design highlight the need for an improved visibility effects generator.

The instant invention overcomes all of the shortcomings of the prior art and accurately implements the mathematical expression for true atmospheric visibility effects. By recombining terms, equation (1) above can be rewritten as follows:

$$E_0 = G(E_1 - E_2) + E_2 \quad (5)$$

Figure 6:
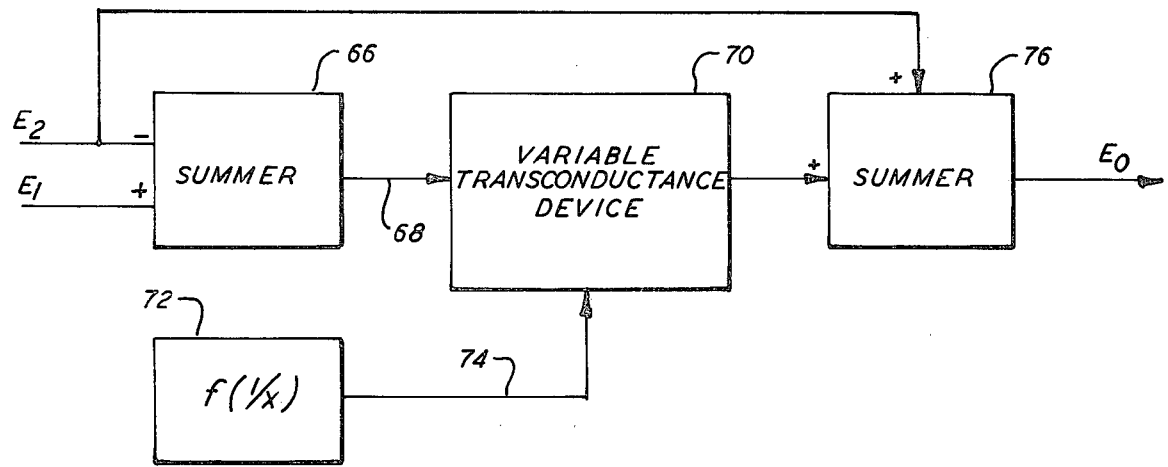
FIG. 6 is a generalized block diagram of the visibility effects generator of the present invention.

Remembering that G is equal to $e^{-K/X}$ and recognizing that a variable transconductance device can be operated in a region such that its gain is an exponential function of its gate voltage, i.e., $$G = e^{KY} \quad (6)$$

where,
Y = the gate voltage
A visibility effects generator such as that shown in FIG. 6 can be created.

The circuit of FIG. 6 directly implements equation 5. As shown in this figure, cloud signal $E_2$ and camera video signal $E_1$ are input to a summer 66 which provides a difference signal, on line 68, equal to $E_1 - E_2$. This difference signal is fed to a variable transconductance device 70 (or other gate-controlled amplifier) exhibiting a gain which is an exponential function of its gate voltage. A function generator 72 provides a control signal which is a function of 1/X, to the gate of amplifier 70 along line 74. Variable transconductance device 70 thus has an effective gain which is an exponential function of 1/X as required for restricted visibility simulation. The cloud signal $E_2$ is added to the output of variable transconductance device 70 in summer 76. The output of summer 76 is a composite video signal $E_0$ which when applied to a television receiver, will produce realistic visibility effects.

The instant invention can be implemented using the same gated video amplifier as was employed in the earlier design. However, unlike the prior art, the present invention uses only one channel of the MC1545G and operates in a region where the log of gain is a linear function of gate voltage.

Figure 7:
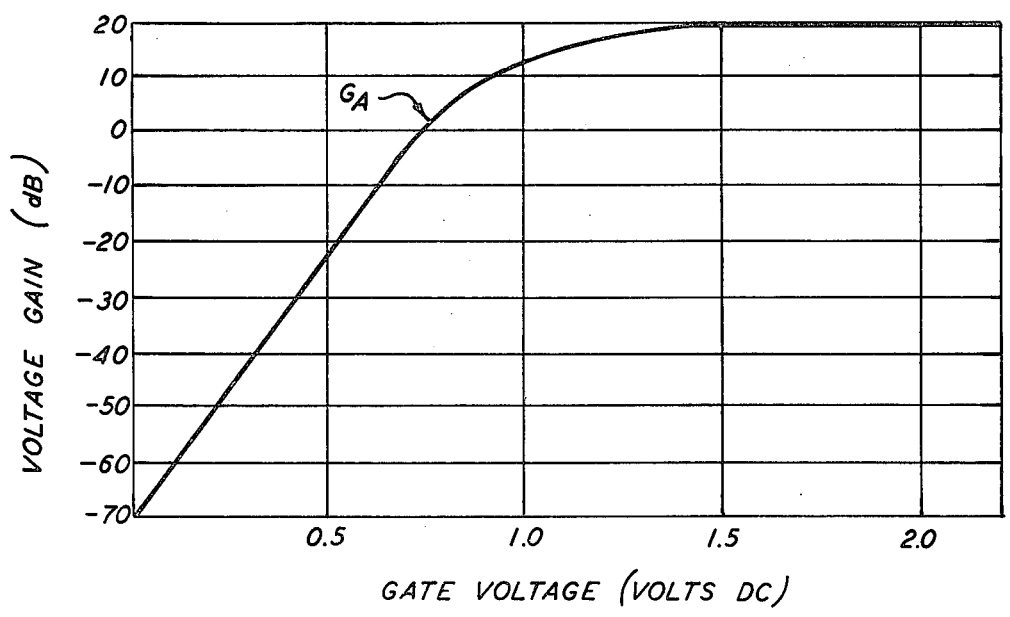
FIG. 7 is a plot illustrating the operational characteristics of a variable transconductance device used in one embodiment of the invention.

FIG. 7 presents a plot of 20 log G versus gate voltage, Vg, for channel A of the MC1545G. Note that in the region from −70 dB to almost 0 dB the curve is linear. The transfer function of channel A of the MC1545G, in this region, can be expressed as follows:

$$V_g = 0.2 \log G + 0.7 \quad (7)$$

substituting equation (2) into equation (7)

$$V_g = .2 \log (e^{-K/X}) + 0.7$$

$$V_g = \frac{-(.2) K \log e}{X} + 0.7$$

$$V_g = \frac{-.0869 K}{X} + 0.7 \quad (8)$$

Equation 8 gives the desired shaping function for the gate voltage. Since the A channel of the MC1545G has differential inputs, $E_1 - E_2$ can be implemented by merely feeding the signals to said inputs.

Figure 8:
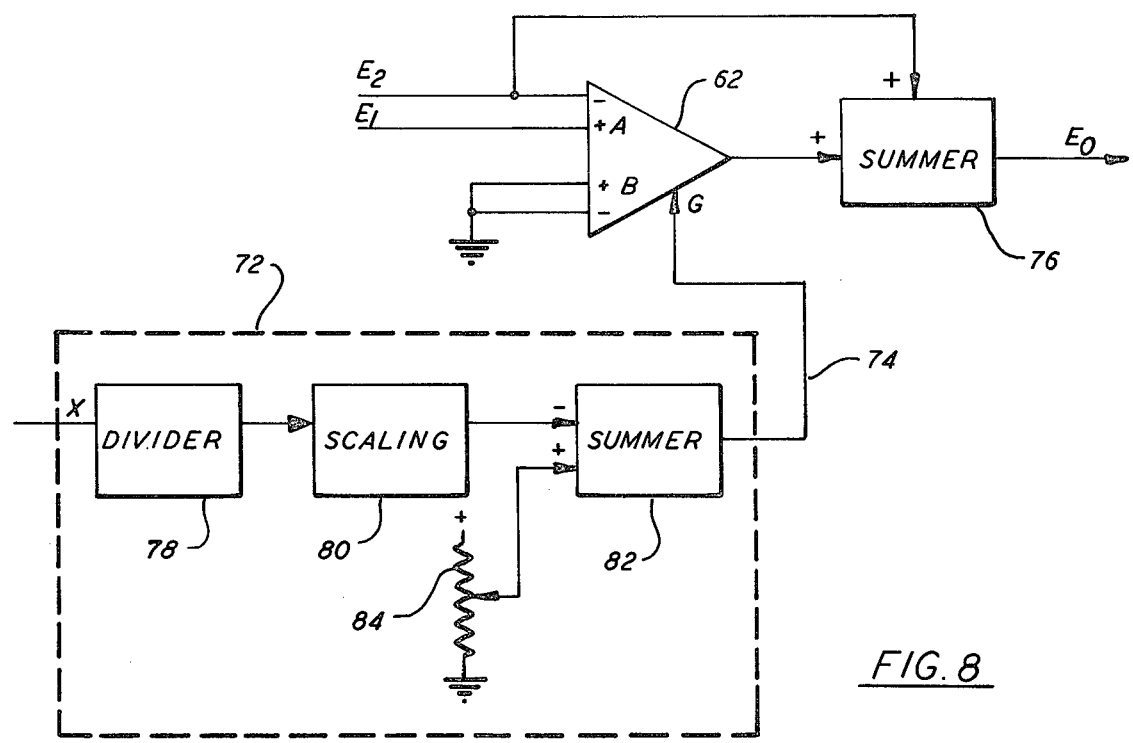
FIG. 8 illustrates a preferred embodiment of the present invention.

This presently-preferred embodiment of the invention is illustrated in FIG. 8. As shown therein, camera video signal $E_1$ is fed to the non-inverting input of channel A of amplifier 62. The cloud signal $E_2$ is fed to the inverting input of channel A and also to one input of summer 76. Since only one channel of the MC1545G is used in the instant invention, both inputs to channel B are grounded.

Function generator 72 produces the desired gate signal from an input signal X. The function generator includes a high speed analog divider 78 for producing an output signal equal to 1/X. This signal is scaled by conventional scaling means 80 and then fed to the inverting input of a summer 82. The non-inverting input of summer 82 receives a constant voltage equal to 0.7 from potentiometer 84. The summer combines these inputs to produce a control signal equal to −0.0869K/X+0.7. This control signal is transmitted along line 74 to the gate of MC1545G.

The output of the video amplifier is provided as a second input to summer 76. Summer 76 adds the cloud signal to the output of the video amplifier to produce the desired composite video signal.

Although the preferred embodiment of applicant's invention employs the same commercially-available gated video amplifier as an earlier visibility effects generator, the present invention, unlike the earlier design, provides the exact function required and is both easily adjusted and mathematically predictable. By employing only a single channel of the MC1545G, video overshoots and object flashing are eliminated. Further, by implementing the mathematical expression for visibility effects exactly, computer look-up tables can be avoided.

Figure 9:
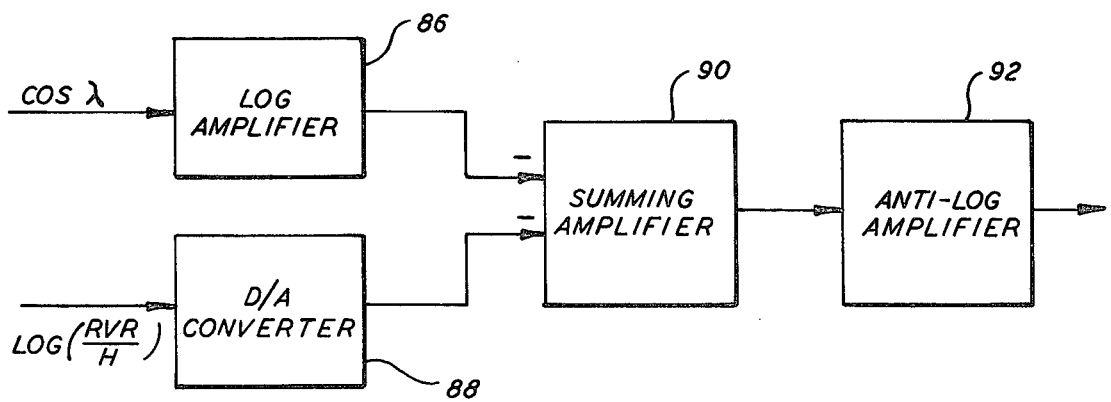
FIG. 9 is a block diagram of a high speed divider useful in the present invention.

FIG. 9 illustrates an implementation of the high speed divider 78 which was used in an actual reduction to practice of the invention. This implementation employed a log amplifier 86 to produce a signal equal to log (cos λ) and a digital-to-analog converter 88 to produce an analog signal representative of log (RVR/H). The outputs of the log amplifier and D/A converter were fed to inverting inputs of a summing amplifier 90. The output of this amplifier was then fed to an anti-log amplifier 92. The output of summing amplifier 92 can be expressed as:

$$-\log(\cos\lambda) - \log(RVR/H),$$

combining terms the output becomes $$-\log\left[\frac{(\cos\lambda)RVR}{H}\right], \text{ which is equal to}$$

$$\log\left[\frac{H}{RVR(\cos\lambda)}\right]$$

The anti-log of this expression, produced by amplifier 92, is thus:

$$\frac{H}{RVR(\cos\lambda)},$$

which equals 1/X.

The use of log amplifiers in the control function generator provides increased dynamic range to the present invention.

Thus a system which generates realistic limited visibility scenes, both above and below the clouds, has been shown. The system may be used not only in camera model visual systems but in any visual system which uses a TV display, either black and white, or color. Although specific embodiments of the invention have been shown, it will be evident to those skilled in the art that various modifications may be made without departing from the spirit of the invention which is intended to be limited solely by the appended claims:

What is claimed is:

1. Apparatus for use in a special effects generator of a flight simulator visual display system, for producing an output video signal representative of restricted visibility conditions from a first video signal and a cloud signal, comprising:
   connector means for providing said first video signal and said cloud signal;
   first means connected to said connector means for subtracting the cloud signal from the first video signal to produce a difference signal;
   second means for providing a control signal which is directly proportional to slant range and inversely proportional to visibility range;
   amplifier means including input means to receive said difference signal and said control signal for amplifying said difference signal in response to said control signal to produce an output, said amplifier means operating in a mode such that the gain of the amplifier means is an exponential function of said control signal; and
   means for adding the cloud signal to the output of the amplifier means to produce an output video signal representative of true atmospheric visibility effects.

2. The apparatus of claim 1 wherein said amplifier means comprises a variable transconductance device operating in a mode wherein the log of its gain is a linear function of said control signal, and said first means comprises differential inputs of said variable transconductance device.

3. The apparatus of claim 2 wherein said second means includes a high speed divider.

4. The apparatus of claim 3 wherein said high speed divider comprises a log anti-log circuit.

5. The apparatus of claim 3 wherein said second means further includes means for scaling the output of said high speed divider and then adding said scaled output to a constant voltage.

6. The apparatus of claim 2 wherein said variable transconductance device comprises one channel of a gate controlled, two-channel, wide band amplifier and said differential inputs comprise the non-inverting and inverting inputs of said one channel.

7. The apparatus of claim 2 wherein said first video signal comprises a camera video signal.

8. The apparatus of claim 2 wherein said first video signal comprises a sky function signal.

9. Apparatus for use in a special effects generator of a flight simulator visual display system, for producing a composite video signal representative of atmospheric visibility effects from a camera video signal and a cloud function signal, comprising:
   first connector means for providing said camera video signal and said second connector means for providing said cloud function signal;
   differential amplifier means having the cloud function signal connected to one input, the camera video signal connected to another input and an effective gain equal to $E^{-K/X}$, where K is a scale factor and X is a function of visibility range and slant range;
   first means for effectively multiplying the difference of the camera video and cloud function signals by $e^{-K/X}$ to produce an output signal; and
   second means for adding the cloud function signal to the output signal from said first means, whereby a composite signal representative of atmospheric visibility effects is produced.

10. The apparatus of claim 9 wherein the differential amplifier is gate controlled and operates in a region where the log of its gain is a linear function of gate voltage and further including means for providing a gate voltage to said amplifier which is a function of 1/X.

11. The apparatus of claim 10 wherein said differential amplifier comprises a variable transconductance device.

12. Apparatus for use in a special effects generator of a flight simulator visual display system for producing an output video signal representative of realistic reduced visibility scenes, having:
   circuit means for providing a first video signal;
   circuit means for providing a cloud signal; and the improvement which comprises:
   a video mixer circuit means having means for receiving said first video signal as one input, means for receiving said cloud signal as a second input, and output means;
   a gate controlled variable conductance means connected to said output means from said video mixer circuit means and adaptable to operating in a range where its gain is an exponential function of its gate signal;

said exponential function being expressed as $e^{-K/X}$, where K is a scale factor and X is a function of visibility range and slant range; and a summer circuit means connected serially with said variable conductance means for providing a realistic composite video signal representative of selectable visibility effects.

13. Apparatus as set forth in claim 12 wherein X is equal to RVR/R and where RVR is the visibility range and R is the distance along a line of sight to the scene being viewed.

14. Apparatus as set forth in claim 12 wherein X is equal to RVR cosine $\lambda$ divided by H, where RVR is the visibility range, $\lambda$ is the angle between the local vertical and an instantaneous line of sight, and H is the height of the simulated aircraft above the terrain.

* * * * *